(12) United States Patent
Hubert et al.

(10) Patent No.: US 11,002,635 B2
(45) Date of Patent: May 11, 2021

(54) SIGNAL PROCESSING METHOD AND DEVICE

(71) Applicant: Aktiebolaget SKF, Gothenburg (SE)

(72) Inventors: Simon Hubert, Saint-Cyr-sur-Loire (FR); Jens Graf, Schweinfurt (DE); Damien Joucgnoux, Mazières de Touraine (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/353,401

(22) Filed: Mar. 14, 2019

(65) Prior Publication Data
US 2019/0331551 A1    Oct. 31, 2019

(30) Foreign Application Priority Data
Apr. 25, 2018  (DE) .......................... 102018206434.2

(51) Int. Cl.
G01M 13/04   (2019.01)
G01M 13/045  (2019.01)

(52) U.S. Cl.
CPC ................................ *G01M 13/045* (2013.01)

(58) Field of Classification Search
CPC ............................ G01M 13/045; G01M 13/04
USPC ......................................................... 340/466
See application file for complete search history.

(56) References Cited

U.S. PATENT DOCUMENTS

| | | | |
|---|---|---|---|
| 3,676,598 A * | 7/1972 | Kurth | H04J 1/04 370/484 |
| 4,527,101 A * | 7/1985 | Zavis | G01P 3/48 318/245 |
| 4,905,284 A * | 2/1990 | Kwang | H04R 3/14 381/100 |
| 5,677,488 A | 10/1997 | Monahan | |
| 7,463,362 B2 * | 12/2008 | Lasker | G01N 21/4795 356/479 |
| 7,509,207 B2 * | 3/2009 | Prasad | G01H 1/006 477/30 |
| 7,543,499 B2 | 6/2009 | Stubenrauch | |
| 7,640,139 B2 * | 12/2009 | Sahara | G01H 1/003 702/182 |
| 7,860,633 B2 | 12/2010 | Stubenrauch | |
| 8,125,323 B2 | 2/2012 | Stephan | |
| 8,427,366 B2 * | 4/2013 | Ganeshan | G01S 19/37 342/357.46 |
| 8,477,876 B2 * | 7/2013 | Meyer | H04L 7/027 375/324 |

(Continued)

FOREIGN PATENT DOCUMENTS

| | | |
|---|---|---|
| DE | 19600640 A1 | 7/1997 |
| EP | 2085755 B1 | 8/2012 |
| WO | 2016040763 A2 | 3/2016 |

*Primary Examiner* — Omar Casillashernandez
(74) *Attorney, Agent, or Firm* — Garcia-Zamor Intellectual Property Law; Ruy Garcia-Zamor; Bryan Peckjian

(57) ABSTRACT

A lean signal processing method, a bearing monitoring unit and a wheel monitoring unit using the lean signal processing method are presented that are especially suitable for embedded systems. The invention is based on the basic inventive idea of digitally adjusting measured signals that are to be analyzed in different frequency bands to thereby enable to have a single common analogue front end and a single common digital spectrum analyzer back end. This will save analogue components and relax the need for memory in addition to a lean signal processing.

9 Claims, 2 Drawing Sheets

(56) References Cited

U.S. PATENT DOCUMENTS

| | | | |
|---|---|---|---|
| 8,688,759 B2* | 4/2014 | Mody | H04L 27/0006 |
| | | | 708/404 |
| 9,037,216 B2* | 5/2015 | Hielscher | A61B 5/7225 |
| | | | 600/425 |
| 9,780,801 B2* | 10/2017 | Heubi | H03M 1/08 |
| 10,417,915 B2* | 9/2019 | Judd | G07C 5/008 |
| 10,444,325 B2* | 10/2019 | Pokrass | G01S 7/2921 |
| 10,484,088 B2* | 11/2019 | Li | H04B 10/0795 |
| 2006/0108170 A1 | 5/2006 | Ishikawa | |
| 2016/0076973 A1 | 3/2016 | White | |
| 2017/0108406 A1* | 4/2017 | Thomson | G01H 1/00 |
| 2020/0158562 A1 | 5/2020 | Hatakeyama | |

* cited by examiner

SIGNAL PROCESSING METHOD AND DEVICE

CROSS-REFERENCE

This application claims priority to German patent application no. 102018206434.2 filed on Apr. 25, 2018, the contents of which are fully incorporated herein by reference.

TECHNOLOGICAL FIELD

The invention concerns signal processing of vibration signals from a rolling element bearing and is more particularly directed to signal processing in an embedded condition monitoring unit monitoring a wheel end rolling element bearing.

BACKGROUND

In the field of rolling element bearings, it is known to attach one or more sensors to measure one or more physical parameters and transduce these physical parameters into electrical signals to thereby monitor the condition of the bearing. One such example is to monitor a wheel bearing of vehicle, such as a truck or a truck trailer. To be able to retrofit a truck or truck trailer with wheel bearing monitoring, it is known to mount a monitoring unit to the wheel rim. Wheel monitoring apparatuses that are mounted on a wheel rim has to be particularly light and robust in order, on the one hand, to avoid an imbalance of the wheel as a result of the weight of the wheel monitoring unit and, on the other hand, to ensure a long service life despite the extreme conditions to which the wheel monitoring unit is exposed to during operation. There seems to be room for improvements.

SUMMARY

An object of the invention is to define a method and devices of signal processing of different frequency bands for analysis that reduces the need for physical and processing resources.

The aforementioned object is achieved according to the invention by a lean signal processing method, a bearing monitoring unit and a wheel monitoring unit using the lean signal processing method are presented that are especially suitable for embedded systems. The invention is based on the basic inventive idea of digitally adjusting measured signals that are to be analyzed in different frequency bands to thereby enable to have a single common analogue front end and a single common digital spectrum analyzer back end. This will save analogue components and relax the need for memory in addition to a lean signal processing.

The aforementioned object is further achieved according to the invention by a method of signal processing an analogue sensor signal for analysis in at least two different frequency bands. For each frequency band the method comprises the steps of low pass filtering, converting, digitally adjusting, spectrum analyzing, analyzing and determining. The step of low pass filtering, low pass filters the analogue sensor signal such that high frequency components are removed. The cut off frequency of the low pass filtering being at least half of the sampling frequency of a following analogue to digital converter. The step of converting converts the low pass filtered analogue sensor signal to a digital signal at a predetermined sampling rate. The sampling rate is the same for all frequency bands that are processed and enables the same low pass filtering to be used for all of the frequency bands. According to the invention the step of digitally adjusting, adjusts the digital signal on the fly according to the parameters of a current one of the at least two frequency bands and according to parameters of a spectrum analysis to be performed. The adjustment is done to take into account the frequency band and fit it into the spectrum analysis that comes. Then the step of spectrum analyzing, performs a spectrum analysis on the digitally adjusted digital signal creating a frequency spectrum. The spectrum analysis utilizes the same parameters for the spectrum analysis independently of which one of the at least two frequency bands is the current frequency band. A spectrum analysis can be done by many different methods, such as Fourier transformation, DFT, FFT, or in this case suitably using a Goertzel algorithm. The step of analyzing analyses the frequency spectrum in view of the digital adjustment done and which one is the current frequency band. The determining step then determines if there is an abnormality in the current frequency band or not. Suitably this is followed by some sort of reporting.

Preferably the step of digitally adjusting the digital signal, comprises decimating the digital signal. In an embedded system the steps are best performed sequentially for each of the at least two different frequency bands. In some embodiments the analogue sensor signals are from a vibration sensor directly or indirectly coupled to rotating equipment such as a roller or ball bearing. In most embodiments a rotational speed is determined and then suitably in the step of analyzing the frequency spectrum comprises identifying frequency peaks and identifying these peaks by means of the determined rotational speed.

The different additional enhancements of the method according to the invention can be combined in any desired manner as long as no conflicting features are combined.

The aforementioned object is also achieved according to the invention by a bearing monitoring unit. The monitoring unit comprises a vibration sensor, an analogue signal processing part, an analogue to digital converter, and a digital processing part. According to the invention the different parts of the monitoring unit are arranged to function as follows. The monitoring unit is arranged to signal process an analogue sensor signal for analysis in at least two different frequency bands. The vibration sensor creates an analogue sensor signal. The analogue signal processing is arranged to low pass filter the analogue sensor signal and possibly also provide amplification. The analogue to digital converter is arranged to convert the low pass filtered analogue sensor signal to a digital signal at a predetermined sampling rate. The predetermined sampling rate is the same for processing all of the frequency bands. The digital processing part is arranged to digitally adjust the digital signal on the fly according a current one of the at least two frequency bands and according to parameters of a spectrum analysis. The digital processing part is also arranged to spectrum analyze the digitally adjusted digital signal creating a frequency spectrum. The same parameters for the spectrum analysis are used independently of which one of the at least two frequency bands is the current frequency band. The digital processing part is further arranged to analyze the frequency spectrum in view of the digital adjustment done and which one is the current frequency band. Finally, the digital processing part also determines if there is an abnormality in the current frequency band. Suitably this is then reported.

In most embodiments the digitally adjusting of the digital signal, comprises decimating the digital signal. The different processing steps are suitably performed sequentially for each of the at least two different frequency bands. Advantageously the vibration sensor is directly or indirectly coupled to rotating equipment that can be a roller or ball bearing. In some embodiments a rotational speed is determined. If a rotational speed is determined, then the processing step of analyzing the frequency spectrum comprises identifying frequency peaks and identifying these peaks by means of the determined rotational speed.

The different additional enhancements of the bearing monitoring unit according to the invention can be combined in any desired manner as long as no conflicting features are combined.

The aforementioned object is further achieved according to the invention by a wheel monitoring unit intended to be mounted on a wheel rim of a vehicle wheel. The wheel monitoring unit comprises a bearing monitoring unit as mentioned above.

The wheel monitoring unit suitably further comprises an output unit to either optically or wirelessly indicate that an abnormality has been determined.

The different additional enhancements of the wheel monitoring unit according to the invention can be combined in any desired manner as long as no conflicting features are combined.

A primary purpose of the invention is to provide a means to minimize usage of resources, both physical, such as memory and analogue components, and processing resources for, for example, calculating a frequency spectrum. This is obtained according to the invention by adjusting sampled sensor signals on the fly to match a desired frequency band to thereby being able to sample different frequency band with the same sampling frequency/rate and to be able to use the same frequency spectrum analysis, suitably using the Goertzel algorithm. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 3.

Figure 1:
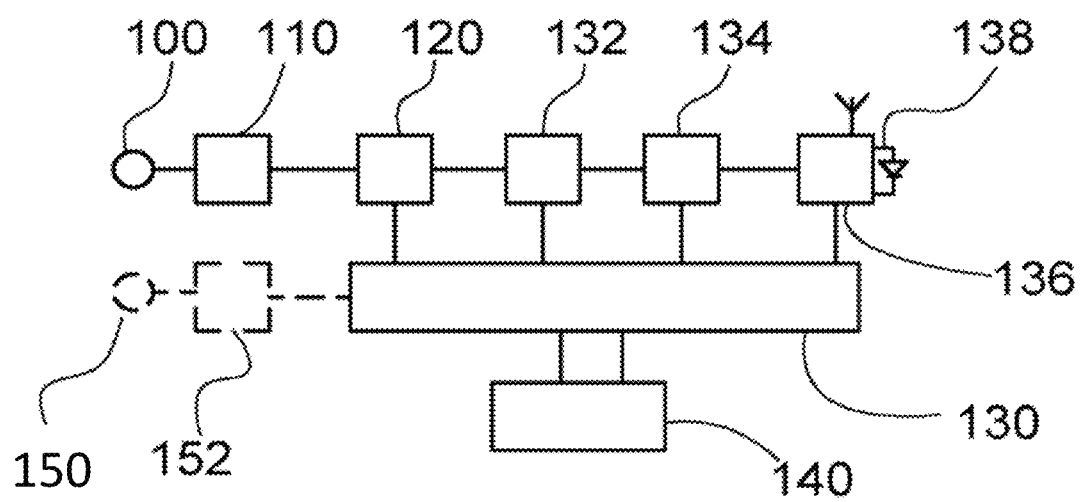
FIG. 1 illustrates a block diagram of an embodiment of a wheel bearing monitoring device according to the invention.

FIG. 1 illustrates a block diagram of an embodiment of a wheel bearing monitoring unit according to the invention. The wheel bearing monitoring unit comprises signal processing according to the invention as is illustrated with FIG. 2. The wheel bearing monitoring unit according to the invention comprises a vibration sensor 100, an analogue signal processing part 110, an analogue to digital converter (A/D, ADC) 120, a controller 130, a digital signal processing part 132, an analysis and determination part 134, an output unit 136, suitably a display part 138, and a power source 140.

An output signal of the vibration sensor 100 is first conditioned by the analogue signal processing 110, which can include amplification, low-pass filtration, to thereby create a vibration signal that is suitable for the analogue to digital converter (A/D, ADC) 120 as to both signal amplitude, dynamics and frequency bandwidth. Entering into the digital domain, one or more controllers/processors 130 supervise, controls and processes the digital signal processing 132, the analysis and determination 134 of the state/condition of the wheel bearing, and also the output unit 136. The output unit can be a power unit to for example power an LED and/or a complete radio transceiver for wireless communication by for example Bluetooth or another wireless communication protocol to for example a smart-telephone app. As a simple human interface, the display 138 is a suitable option, be it the only interface or as an addition. The simplest form of a display is an LED. The power source 140, can be a battery and/or a power harvester. Speed or rotations per minute (RPM) is an important factor for the digital signal processing. If it is not provided from some external source or derived by other means, then it can be suitable to have an optional speed/RPM sensor 150 that might need some sort of optional speed processing unit 152 to create a speed/RPM signal that is suitable.

The whole digital domain, can be realized within one microcontroller comprising one or more central processing units (CPUs), program and data memory, input/output ports, analogue to digital conversion, and possible also circuitry to be able to directly perform some of the signal processing tasks directly, such as the Goertzel algorithm. Other configurations are of course possible, there can be possible to also integrate the analogue processing or have one or more of the digital parts as a separate part, such as data memory/buffers, or all or part as an ASIC (Application Specific Integrated Circuit).

Figure 2:
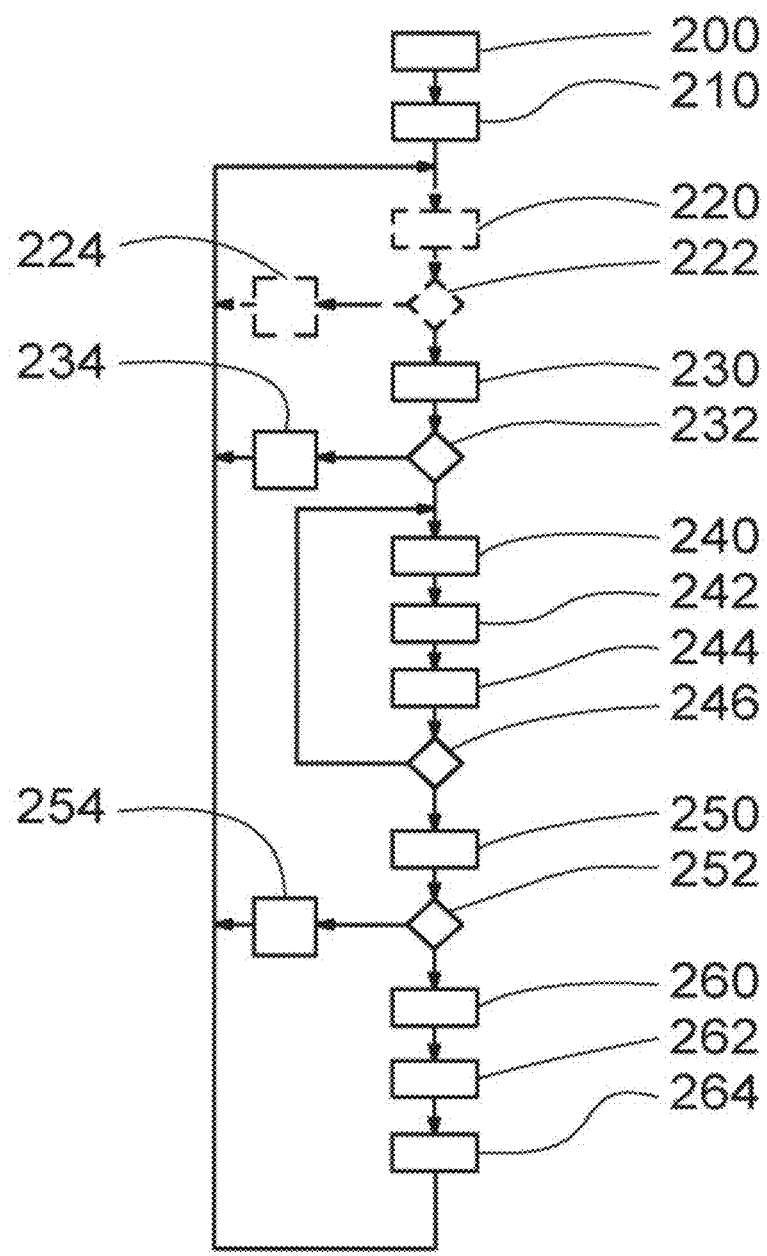
FIG. 2 illustrates a flow chart of an embodiment of the signal processing according to the invention.

FIG. 2 illustrates a flow chart of an embodiment of the signal processing according to the invention with a number of process step. A first step start 200 is a suitable entry from a cold, a power on, or warm, a recovery, start. Thereafter in a second step initial setup 210, a controller or ASIC suitably initializes all registers and variables, prepares any input and output ports including an A/D converter, timers etc. Suitably some sort of human interface feedback is also given that the unit is properly activated and functioning properly. In a first optional step 220, a signal level from a vibration sensor is measured. In a second optional step 222 it is determined if the signal level measured from the vibration sensor is above or below a predetermined threshold. Measurement and determination can be done both in the analogue domain and the digital domain. If it is done in the analogue domain, then additional analogue components are required, such as a comparator. If it is done in the digital domain, more processing resources are required by A/D conversion and digital signal processing, thus more battery power is used. If the measured signal level is above the predetermined threshold, then it is determined that the bearing/wheel bearing is rotating, and the process continues with a third step 230, if not, then the process continues with a third optional step 224. The third optional step is a delay, an optional predetermined delay time before the process continues with the first optional step 220. The optional predetermined delay can suitably be in the range of seconds, minutes to hours. By including the optional steps 220, 222, 224 it can be determined if a vehicle and/or bearing/wheel bearing is moving/rotating with relatively little processing, thus saving battery.

The third step 230 is an acquisition/determination of speed/rotation step. The speed/rotation be acquired by a speed/rotation signal, or determined by means of an additional speed/rotation sensor, or some by some other means.

In a fourth step 232 it is determined if the speed/rotation is faster than a predetermined speed/rotation. If it is, the process continues with a sixth step 240, if not, then the process continues with a fifth step 234. The fifth step 234 is a delay, a first delay time before the process continues with either the first optional step 220 if it is there or otherwise with the third step 230. The first delay time can be either predetermined or variable in view of for example speed/rotation and/or presence of the optional steps 220-224. The first predetermined delay time can suitably be in the range of minutes if the optional steps 220-224 are present, otherwise the first delay time can also extend to hours if the speed was determined to be zero. It is important for the signal processing that the speed/rotation is within a certain range. If it is outside this range, the process thus waits a while to see if the speed/rotation is within the range a bit later. If the speed/rotation is zero, then it might be a while before it starts, thus the reason to increase the first delay time up into hours.

In the sixth step 240 the vibration sensor signals are sampled for a predetermined sampling time at a predetermined sampling rate and then resampled by low pass filtering and down-sampling in real time creating an equivalent sampling rate. How much the vibration sensor signals are down-sampled will be in dependence of what band is currently to be analyzed, according to the invention at least two different bands, covering different frequency bands and thereby having different equivalent sampling rates. All the different bands are physically sampled at the same sampling frequency by the A/D converter. This enables to have the same analogue signal processing, especially the low pass filtering before the A/D conversion for all three bands. The real-time decimation (low pass filtering and down-sampling) will then create individual equivalent sampling rates for each band to be analyzed. If the actual sampling frequency/rate of the A/D converter would be optimized for each individual band, then there would also have to be individual analogue signal processing to fit each band's sampling rate. The real-time decimation also saves on the amount of memory needed to store each sampling set. In dependence on the frequency bands and the sought-after frequencies, further decimation and non-linear calculations such as absolute value, can be done. This is done to align the different sampling sets for the spectrum analysis.

After the sixth step 240, which samples the vibration sensor signals and first creates equivalent sampling rates sampling sets, and then aligned sampling sets, the process continues with a seventh step 242. The seventh step 242 performs a spectrum analysis, such as via Fourier transformation, FFT, or suitably using the Goertzel algorithm. By having aligned sampling sets, the spectrum analysis can be performed in the same way, with the same parameters for all of the aligned sampling sets. This enables the spectrum analysis to be hard wired if desired, and even if it is done in software, it simplifies the programming, saves memory space and requires just optimization of one spectrum analysis. After the seventh step 242 doing the spectrum analysis, an eighth step 244 does any necessary further signal processing, such as peak detection.

Thereafter a ninth step 246 checks to see if all bands have been done. If all the bands have been done then the processing continues with a tenth step 250, otherwise the next band is selected and the process continues with the sixth step 240. In most embodiments there are two to four bands that are traditionally used for condition monitoring of ball/roller bearings. The tenth step 250 acquires/determines speed/rotation. This is either done by a speed/rotation signal, by an additional speed sensor, or some other means. An eleventh step 252 then determines if the speed/rotation is within a predetermined range from the previously acquired/determined speed/rotation in the third step 230. If the speed/rotation is within the predetermined range, the process continues with a thirteenth step 260, if not, then the process continues with a twelfth step 254. The twelfth step 254 is a second delay time before the process continues with either the first optional step 220 if it is there, or otherwise with the third step 230. The second delay time can be either predetermined or variable in view of for example speed/rotation. The second delay time can suitably be in the range of minutes, or the second delay time can also extend to hours if the speed/rotation was determined to be zero. In some embodiments it is possible to acquire/determine the speed/rotation in parallel with the sampling of the vibration sensor signals. Determination if the speed/rotation is within a specified range during sampling is then also done in parallel with the sampling.

The thirteenth step 260 does further processing/analysis/comparison to be able to determine a status of the bearing. A fourteenth step 262 can then output the status in the form of a LED optically signaling that a bearing is not in its optimum state, and/or it can be transfer via Bluetooth or another wireless protocol such as Wi-Fi, to a smartphone app, and/or a concentrator that will submit the state of each monitored bearing of a, for example, vehicle, up to a central monitoring unit. All the processing of the vibration sensor signals for all bands are done and the fifteenth step 264 puts the process on hold by means of a third delay time, before the process continues with either the first optional step 220 if it is there or otherwise with the third step 230. The third delay time can be either predetermined or variable in view of for example the state of the bearing, if there are no indications, then less frequent monitoring is needed, that is long delay time, while when wear starts to show, then more frequent monitoring is needed, thus shorter delays.

Figure 3:
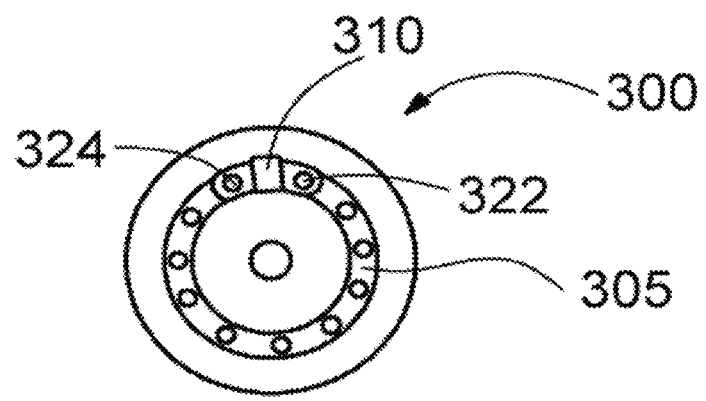
FIG. 3 illustrates a vehicle wheel having a wheel bearing monitoring unit embodiment according to the invention that comprises signal processing according to the invention.

FIG. 3 illustrates a vehicle wheel 300 having a wheel bearing monitoring unit 310 embodiment according to the invention that comprises signal processing according to the invention. The wheel bearing monitoring unit 310 is suitably attached to the wheel rim 305 by two wheel lug bolts 322, 324 to get a good transmission of vibrations from the wheel bearing.

Because the wheel bearing monitoring unit 310 includes means for detecting, evaluating and signaling as a relatively structurally compact unit, the unit can be generally be easily retrofitted by for example locating the device between two wheel lugs and the wheel rim. With the unit being attached by tightening the wheel lug bolts/nuts.

The invention is based on the basic inventive idea of digitally adjusting measured signals that are to be analyzed in different frequency bands to thereby enable to have a single common analogue front end and a single common digital spectrum analyzer at the back end. This will save analogue components and relax the need for memory. The invention is not restricted to the above-described embodiments but may be varied within the scope of the following claims.

REFERENCE NUMBER LISTING

FIG. 1 illustrates a block diagram of an embodiment of a wheel bearing monitoring device according to the invention:
100 Vibration sensor,
110 Analogue signal processing,
120 Analogue to digital converter (A/D, ADC),
130 Controller, 132 Digital signal processing,
134 Analysis and determination of the state/condition of the wheel bearing,
136 Output unit, to for example power an LED and/or Bluetooth (or another protocol) wireless communication to for example a smart-telephone app,
138 Display, such as an LED,
140 Power source, such as a battery and/or power harvester,
150 Optional speed sensor,
152 Optional speed processing unit.

FIG. 2 illustrates a flow chart of an embodiment of the signal processing according to the invention:
200 Start,
210 Initial setup,
220 Optional—measure signal level from vibration sensor,
222 Optional—determine if the signal level measured from the vibration sensor is above or below a predetermined threshold, if the measured signal level is above the predetermined threshold, then it is determined that the bearing/wheel bearing is rotating and the process continues with step 230, if not, then the process continues with step 224,
224 Optional—delay, an optional predetermined delay time before the process continues with optional step 220, the optional predetermined delay can suitably be in the range of seconds, minutes to hours,
230 Acquisition/determination of speed/rotation, either by a speed/rotation signal, by an additional speed/rotation sensor, or some other means,
232 Determination if the speed/rotation is faster than a predetermined speed/rotation, if it is, the process continues with step 240, if not, then the process continues with step 234,
234 Delay, a first delay time before the process continues with either step 220 if it is there or otherwise with step 230, the first delay time can be either predetermined or variable in view of for example speed and/or presence of the optional steps 220-224, the first predetermined delay time can suitably be in the range of minutes if the optional steps 220-224 are present, otherwise the first delay time can also extend to hours if the speed was determined to be zero,
240 Sampling of the vibration sensor signals for a predetermined sampling time at a predetermined sampling rate and then resampled in real time to create equivalent sampling rates in dependence of what band is currently to be analyzed, according to the invention at least two different bands, covering different frequency bands and thereby having different equivalent sampling rates, in dependence on the frequency bands and the sought after frequencies, further decimation (low pass filtering and down-sampling) and non-linear calculations such as absolute value, can be done,
242 Spectrum analysis, such as via Fourier transformation, FFT, or suitably using the Goertzel algorithm,
244 Further signal processing, such as peak detection,
246 Check to see if all bands have been done, if all has been done then the processing continues with step 250 otherwise the next band is selected and the process continues with step 240, in most embodiments there are two to four bands that are traditionally used for condition monitoring of ball/roller bearings,
250 Acquisition/determination of speed/rotation, either by a speed/rotation signal, by an additional speed sensor, or some other means,
252 Determination if the speed/rotation is within a predetermined range from the previously acquired/determined speed/rotation in step 230, if it is, the process continues with step 260, if not, then the process continues with step 254,
254 Delay, a second delay time before the process continues with either optional step 220 if it is there or otherwise with step 230, the second delay time can be either predetermined or variable in view of for example speed/rotation, the second delay time can suitably be in the range of minutes, or the second delay time can also extend to hours if the speed/rotation was determined to be zero,
260 Further processing/analysis/comparison,
262 Status output can be in the form of a LED optically signaling that a bearing is not in its optimum state, and/or it can be via Bluetooth or another wireless protocol such as Wi-Fi, to a smartphone app, and/or a concentrator that will submit the state of each monitored bearing of a for example a vehicle, up to a central monitoring unit,
264 Delay, a third delay time before the process continues with either optional step 220 if it is there or otherwise with step 230, the third delay time can be either predetermined or variable in view of for example the state of the bearing, if there are no indications, then less frequent monitoring is needed, that is long delay times, while wear starts to show, then more frequent monitoring is needed, shorter delays.

FIG. 3 illustrates a vehicle wheel having a wheel bearing monitoring unit embodiment according to the invention that comprises signal processing according to the invention:
300 Vehicle wheel,
305 Wheel rim,
310 Wheel bearing monitoring unit,
322 Wheel nut,
324 Wheel nut.

What is claimed is:
1. A method of signal processing an analogue sensor signal for analysis in at least two different frequency bands, for each frequency band the method comprises the steps of:
processing the analogue sensor signal, comprising the steps of:
low pass filtering the analogue sensor signal;
converting the low pass filtered analogue sensor signal to a digital signal at a predetermined sampling rate;
digitally adjusting, in real time, the digital signal based on: (1) a current frequency band formed by one of the at least two different frequency bands, and (2) a plurality of parameters of a spectrum analysis;
spectrum analyzing, after the digitally adjusting thereof, the digital signal to create a frequency spectrum, utilizing the plurality of parameters used during the digitally adjusting regardless of which one of the at least two different frequency bands is the current frequency band;
analyzing the frequency spectrum in view of: (1) the digitally adjusting performed on the digital signal, and (2) which one of the at least two different frequency bands is the current frequency band;
determining if there is an abnormality in the current frequency band;
repeating the processing the analogue sensor signal step after a time delay, wherein the time delay is variable and is reduced when the abnormality is detected.

2. The method according to claim 1, wherein the step of digitally adjusting the digital signal, comprises decimating the digital signal.

3. The method according any to claim 1, wherein the steps are performed sequentially for each of the at least two different frequency bands.

4. The method according to claim 1, wherein the analogue sensor signals are from a vibration sensor directly or indirectly coupled to rotating equipment.

5. The method according to claim 4, wherein the rotating equipment is a roller or ball bearing.

6. The method according to claim 4, wherein a rotational speed is determined.

7. The method according to claim 6, wherein the step of analyzing the frequency spectrum comprises identifying frequency peaks and identifying these peaks by means of the determined rotational speed.

8. A bearing monitoring unit comprising:
- a vibration sensor configured to transmit an analogue sensor signal for analysis in at least two different frequency bands,
- an analogue signal processing part in communication with the vibration sensor, wherein the analogue signal processing part is configured to low pass filter the analogue sensor signal,
- an analogue to digital converter in communication with the analogue signal processing part, wherein the analogue to digital converter is configured to convert, after low pass filtering, the analogue sensor signal to a digital signal at a predetermined sampling rate;
- a digital signal processing part in communication with the analogue to digital converter, the digital signal processing part being configured to digitally adjust, in real time, the digital signal based on: (1) a current frequency band formed by one of the at least two different frequency bands, and (2) a plurality of parameters of a spectrum analysis;
- an analysis and determination part in communication with the digital signal processing part, wherein the analysis and determination part is configured to:
  (1) spectrum analyze, after the digitally adjusting thereof, the digital signal to create a frequency spectrum using the plurality of parameters used during the digitally adjusting regardless of which one of the at least two different frequency bands is the current frequency band;
  analyzing the frequency spectrum in view of: (A) the digitally adjusting performed on the digital signal, and (B) which one of the at least two frequency bands is the current frequency band; and
  (2) determine if there is an abnormality in the current frequency band; and
- a controller in communication with: (1) the analogue signal processing part, (2) the analogue to digital converter, (3) the digital signal processing part, and (4) the analysis and determination part, wherein the controller is configured to have the analogue signal repeatedly processed, with a time delay between each processing, by the: (1) the analogue signal processing part, (2) the analogue to digital converter, (3) the digital signal processing part, and (4) the analysis and determination part, wherein the time delay is variable and is reduced when the abnormality is detected.

9. A wheel monitoring unit intended to be mounted on a wheel rim of a vehicle wheel, wherein the wheel monitoring unit comprises the bearing monitoring unit of claim 8, and wherein the wheel monitoring unit further comprises an output unit configured to either optically or wirelessly indicate that the abnormality has been determined.

* * * * *